United States Patent
Takahata et al.

[11] Patent Number: 5,864,940
[45] Date of Patent: Feb. 2, 1999

[54] METHOD FOR PRODUCING A WINDING OF A STATOR COIL

[75] Inventors: Toshihiro Takahata, Mino; Kunihiro Nishiyama, Uji; Keiji Naitou; Shigeki Munezawa, both of Takefu, all of Japan

[73] Assignee: Matsushita Electric Industrial Co., Ltd, Osaka-Fu, Japan

[21] Appl. No.: 566,039

[22] Filed: Dec. 1, 1995

[30] Foreign Application Priority Data

Dec. 2, 1994 [JP] Japan .................................. 6-299505

[51] Int. Cl.$^6$ ............................................... H02K 15/095
[52] U.S. Cl. ............................. 29/596; 29/736; 140/92.2
[58] Field of Search ............................. 29/732, 736, 596, 29/606; 140/92.2, 92.1

[56] References Cited

U.S. PATENT DOCUMENTS

| | | | |
|---|---|---|---|
| 3,415,292 | 12/1968 | Ericson | 29/732 X |
| 3,579,791 | 5/1971 | Arnold . | |
| 3,691,606 | 9/1972 | Muskulus | 29/732 |
| 3,698,063 | 10/1972 | Smith . | |
| 3,724,515 | 4/1973 | Eminger | 29/732 X |
| 3,866,847 | 2/1975 | Droll | 140/92.2 X |
| 5,022,139 | 6/1991 | Jensen | 29/736 X |

*Primary Examiner*—Carl E. Hall
*Attorney, Agent, or Firm*—Wenderoth, Lind & Ponack, L.L.P.

[57] ABSTRACT

A stator coil winding is produced by supplying a wire to a winding frame with a nozzle, holding a terminal end of the wire by a holding device, rotating the winding frame with a driving device to wind the wire around the winding frame while the nozzle is moved by a nozzle-moving device parallel to a rotary shaft of the winding frame, holding a terminal end of the wire wound around the winding frame with the holding device after the wire is completely wound around the winding frame, and carrying the completely wound winding frame to a coil insertion jig with a transferring device, separating the winding frame into winding frame elements at a face orthogonal to the rotary shaft of the winding frame, and the winding frame elements are rotated about a fulcrum in a vicinity of the face to thereby hold the separated winding frame elements so that rotary shafts of the separated winding frame elements are parallel to each other, by a handling mechanism. A coil formed by the wire wound around each separated winding frame is moved to the insertion jig by a coil-moving mechanism, and the transferred coils on the insertion are inserted in to a stator core by an insertion device. An apparatus for carrying out the above includes the above devices and mechanisms.

6 Claims, 18 Drawing Sheets

METHOD FOR PRODUCING A WINDING OF A STATOR COIL

BACKGROUND OF THE INVENTION

The present invention relates to a method apparatus for producing stator coil windings of motors.

High efficiency and high quality are required for recent motors, which induces an urgent need to make improvements in the production of windings of stators.

Related prior art will be depicted hereinbelow.

FIG. 17 shows a conventional flyer-type winding machine for a stator, in which reference numerals represent, respectively: 1 a rotating flyer; 2 a nozzle attached at an end of the flyer; 3 a winding frame; 4 a coil insertion jig; 5 a wire; 6 a bobbin pack; 7 a wire path; 8 a motor for driving the flyer; 9 a turntable; 10 the coil insertion jig at an insertion position; 11 a coil insertion device; and 12 a core retainer.

Referring further to FIG. 18, reference numerals are, respectively: 13 a timing pulley mounted to the driving motor 8; 14 a timing pulley mounted to the flyer 1; 15 a timing belt for transmitting the rotation of the timing pulleys 13, 14; 16 a loop-shaped blade composed of a plurality of blade elements 16a; and 17 a loop-shaped wedge guide in touch with the blade 16 and which is composed of a plurality of wedge guide elements 17a. The blade element 16a and wedge guide element 17a are shown in FIGS. 34–36. Reference numeral 302 denotes a wedge located between the wedge guide elements 17a.

A winding operation of the flyer-type winding machine in the above constitution will be described together with an operation to move a coil to the coil insertion jig 4.

Reference numerals 18 and 19 in FIG. 19 indicate a fixed winding frame which is a part of the winding frame 3 so constructed as to be projectable into the coil insertion jig 4 with a small gap, and a movable winding frame pairing with the fixed winding frame 18, respectively. In the first place, as shown in FIGS. 19 and 20, a first stage of the winding frame 3, constituted in a plurality of stages projects into the coil insertion jig 4, and the flyer 1 rotates about the outer periphery of the winding frame 3. A wire 5 sent out from the nozzle 2 is wound a predetermined number of times at the first stage of the winding frame 3. Thereafter, the winding frame 3 descends as shown in FIGS. 21 and 22, to wind the wire 5 a predetermined number of times to a second stage of the winding frame 3. After the winding operation is repeated for a plurality of stages as in FIGS. 23 and 24, the flyer 1 stops and the wound coil is moved to the blade 16 and wedge guide 17 of the coil insertion jig 4 by a raking jig 20, when the winding frame 3 moves up, completing a winding of a first pole as is clearly shown in FIGS. 25 and 26. In a next step of FIG. 27, the coil insertion jig 4 rotates to accomplish a winding of a second pole similarly to the winding of the first pole. FIG. 28 illustrates a state when windings of a plurality of poles are completed.

After a stator core 300 of FIGS. 39 and 40 with an insulating paper 301 inserted into a slot 300a of the stator core 300 is placed on the blade 16 and the wedge guide 17 by the core retainer 12 as shown in FIG. 37, the windings of the coil insertion jig 4 are set in the stator core 300 as shown in FIG. 38 to form a stator coil of FIG. 41.

In the above-described conventional arrangement, a wire 101 continuing from a final stage of the first pole to a first stage of the second pole always intersects coils 102 and 103 wound at a second stage of the second pole and thereafter. As a result, an excessive load is disadvantageously applied to the wire when the crossing wires are in touch with each other. Moreover, the wire 5 is twisted every time the flyer 1 rotates in the outer periphery of the winding frame 3 in FIG. 30, whereby an unwelcome excessive load is impressed to the wire 5.

SUMMARY OF THE INVENTION

Accordingly, an object of the present invention is to provide a method and an apparatus for producing stator coil windings without applying an excessive load to wires, to thereby to realize high efficiency and high quality of motors.

In accomplishing these and other objects, according to a first aspect of the present invention, there is provided a method for producing a stator coil winding, comprising the steps of:

winding a wire fed from a nozzle around a separable winding frame while the winding frame is rotated;

separating the separable winding frame; and inserting a coil formed by the wire wound around each separated winding element of the winding frame to a coil insertion jig to thereby form coils of a plurality of poles which are in turn inserted into a stator core, thus forming a stator coil.

According to a second aspect of the present invention, there is provided a method for producing a stator coil winding, comprising the steps of:

supplying a wire to a winding frame with a nozzle;

holding a terminal end of the wire with a holding device;

rotating the winding frame with a driving device to wind the wire around the winding frame while the nozzle is moved by a nozzle-moving device in parallel to a rotary shaft of the winding frame;

holding a terminal end of the wire wound around the winding frame with the holding device after the wire is completely wound around the winding frame;

carrying the completely wound winding frame to a coil insertion jig with a transferring device;

separating the winding frame into winding frame elements at a face orthogonal to the rotary shaft of the winding frame, and rotating the winding frame elements about a fulcrum in a vicinity of the face to thereby hold the separated winding frame elements so that rotary shafts of the separated winding frame elements are parallel to each other, with a handling mechanism;

moving a coil formed by the wire wound around each separated winding frame to the insertion jig by a coil-moving mechanism; and inserting the transferred coils in the insertion jig to a stator core with an insertion device.

According to a third aspect of the present invention, there is provided an apparatus for producing a stator coil winding, comprising:

a winding frame separable into two winding frame elements at a face orthogonal to a rotary shaft thereof, around which a wire is wound;

a supporting device for holding the winding frame during rotation of the winding frame and performing attachment and detachment of the winding frame to and from the apparatus;

a driving device for rotating the winding frame;

a nozzle for supplying the wire to the winding frame;

a nozzle-moving device for moving the nozzle in parallel to the rotary shaft of the winding frame;

a holding device for holding terminal ends of the wire when the wire is wound around the winding frame;

a transferring device for carrying the completely wound winding frame to a coil insertion jig;

a handling mechanism for separating the winding frame into the winding frame elements at the face orthogonal to the rotary shaft, and rotating the winding frame elements about a fulcrum in a vicinity of the face, to thereby to hold the separated winding frame elements so that rotary shafts of the separated winding frame elements are parallel to each other;

a coil-moving mechanism for moving a coil formed by the wire wound around each separated winding frame to the insertion jig; and an insertion device for inserting the transferred coils in the insertion jig to a stator core.

BRIEF DESCRIPTION OF THE DRAWINGS

These and other objects and features of the present invention will become clear from the following description taken in conjunction with the preferred embodiments thereof and with reference to the accompanying drawings, in which.

DETAILED DESCRIPTION OF THE PREFERRED EMBODIMENT

Figure 1:
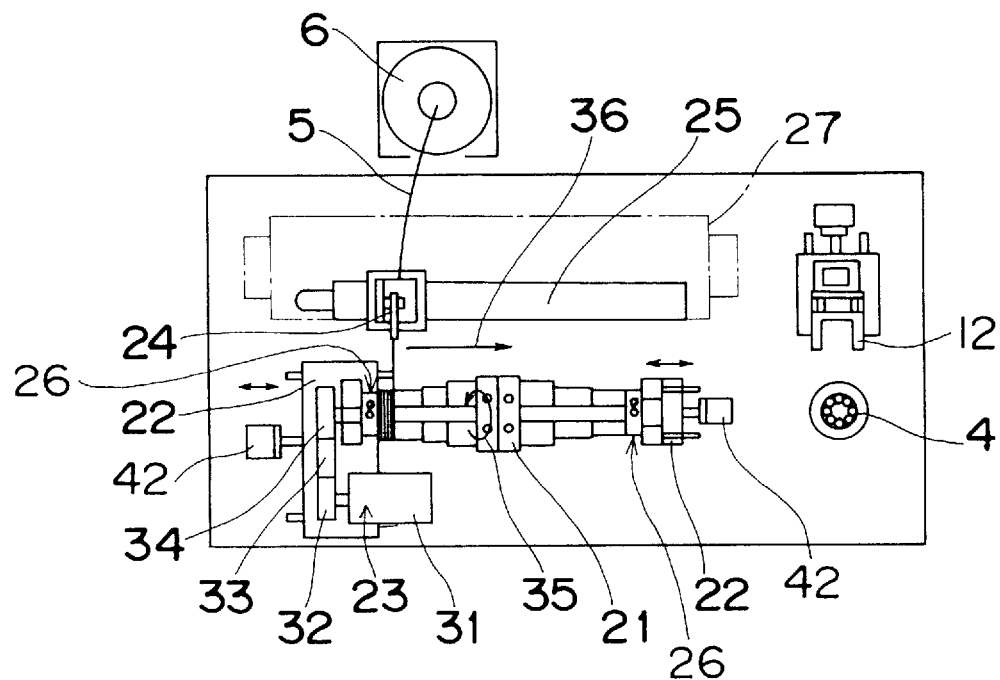
FIG. 1 is a plan view of a winding apparatus for a stator according to a first embodiment of the present invention.

Before the description of the present invention proceeds, it is to be noted that like parts are designated by like reference numerals throughout the accompanying drawings.

A first embodiment of the present invention will be discussed with reference to the accompanying drawings.

Figure 2:
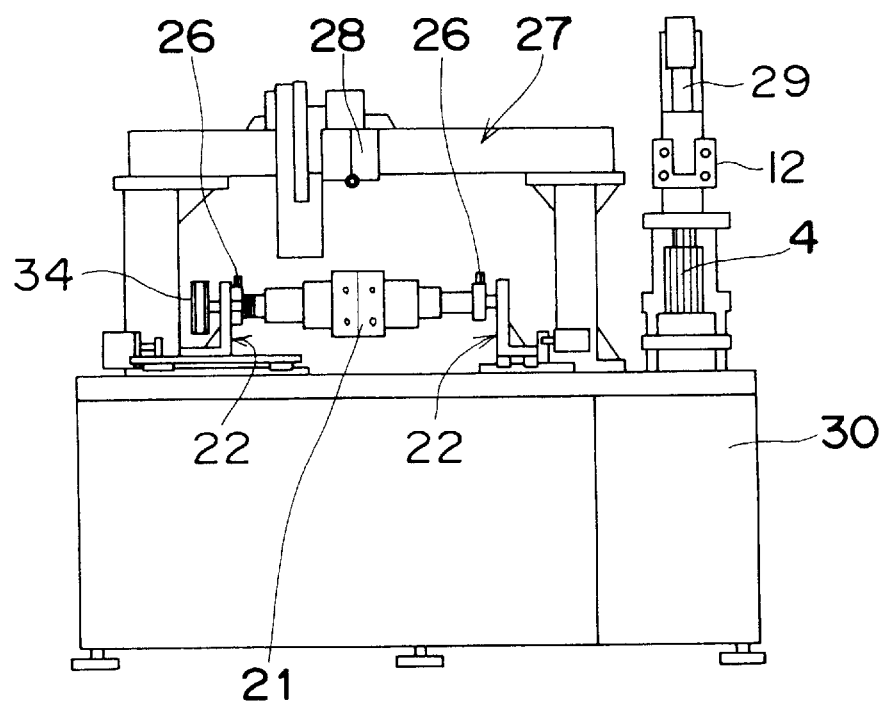
FIG. 2 is a front view of the stator coil winding apparatus of FIG. 1.
Figure 3:
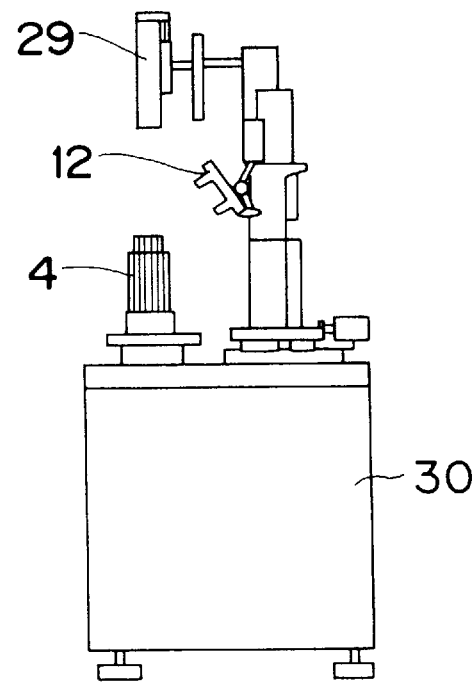
FIG. 3 is a right side view of the stator coil winding apparatus of FIG. 1.
Figure 4:
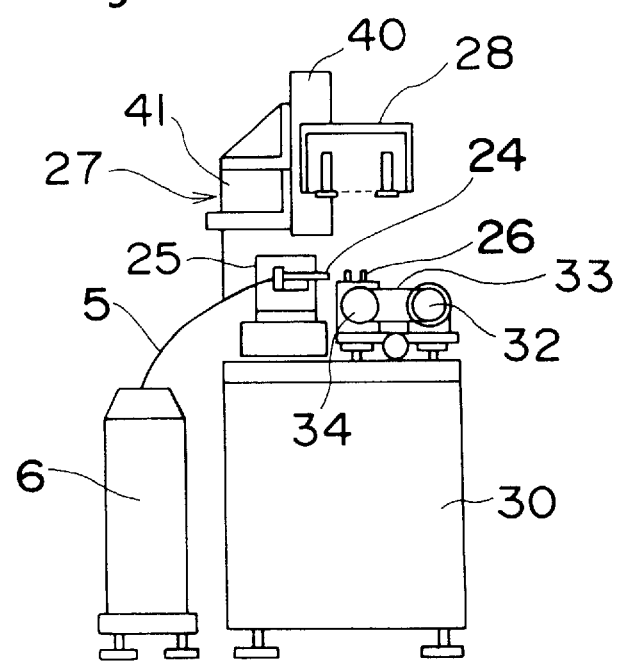
FIG. 4 is a left side view of the stator coil winding apparatus of FIG. 1.

FIG. 1 shows an appearance of an apparatus for producing windings of stator coils in a first embodiment of the present invention. In the apparatus of FIG. 1, a winding frame 21, separable into winding frame elements 21a at a vertical face perpendicular to a rotary shaft thereof, is rotatably held in a detachable manner by a supporting mechanism 22. The vertical face is located at a connection part at which the winding frame elements engage with each other. The winding frame 21 is rotated by a driving device 23 constructed by a motor 31, a motor-side timing pulley 32, a timing belt 33, and a winding frame-side timing pulley 34. A nozzle 24 feeds and winds a wire 5 to the winding frame 21 and is moved parallel to the rotary shaft of the winding frame 21 by a nozzle-moving device 25. The producing apparatus further includes, as shown in FIG. 2, holding mechanisms 26 for holding terminal ends of the wire 5 when the wire 5 is wound, a transferring device 27 for carrying the wound winding frame 21 to a coil insertion jig 4 provided separately, and a handling mechanism 28 for separating the winding frame 21 and oscillating about a fulcrum in the vicinity of the rotary shaft within the vertical face, thereby holding the separated winding frame elements 21a so that the rotary shafts of the elements 21a are parallel to each other. Moreover, there are provided in FIG. 3 a coil-moving mechanism 29 for transferring coils wound around the separated winding frame elements 21a to the coil insertion jig 4 and an insertion device 30 for inserting the transferred coils into a stator core by means of the coil insertion jig 4.

The apparatus of the above-described constitution operates in a manner as follows.

Referring back to FIG. 1, when the rotation of the motor 31 is transmitted by the driving device 23, i.e., the timing pulley 32, the timing belt 33 at the side of the motor 31, and the timing pulley 34 at the side of the winding frame 21, the winding frame 21 is rotated in a rotating direction 35. At this time, a terminal end of the wire 5 is held by one of the holding mechanisms 26 and the nozzle 24 set approximately at right angles to the rotary shaft of the winding frame 21 is moved in a transferring direction 36 by the nozzle-moving device 25 parallel to the rotary shaft of the winding frame 21. The wire 5 sent out from the nozzle 24 is wound on the winding frame 21. The terminal end of the wire 5, after being wound, is retained by the other of the holding mechanisms 26, thus completing a winding operation. During the winding operation, the wire 5 from the nozzle 24 is wound on the rotating winding frame 21 so that the wire 5 is prevented from twisting. Thus the wire is wound through the connection part, winding from one winding frame element 21a to the other.

Figure 31:
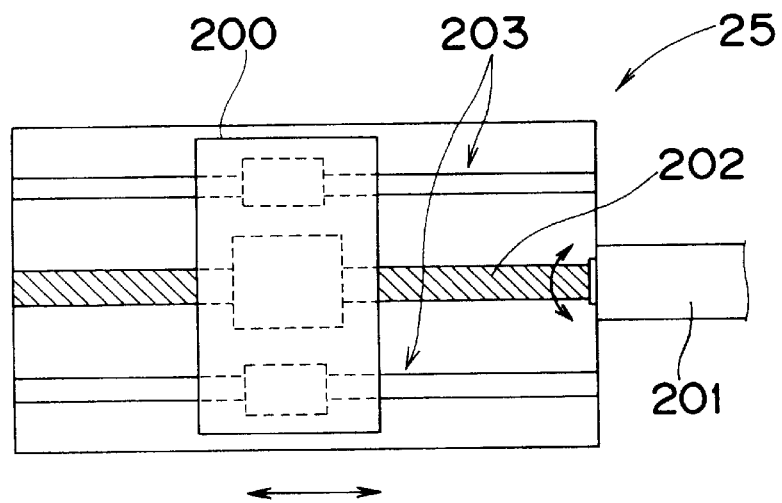
FIG. 31 is a plan view of a nozzle-moving device in the first embodiment.

As shown in FIG. 31, the nozzle-moving device 25 is composed of a table 200, a motor 201 for driving the table 200 in right and left directions in FIG. 31, a ball screw shaft 202 for being rotated by the motor 201 and connected to the table 200, and a pair of linear movement guides 203 for guiding the linear movement of the table 200 caused by being driven by the motor 201 in an arrow direction in FIG. 31. The nozzle 24 is set on the table 200.

Figure 5A:
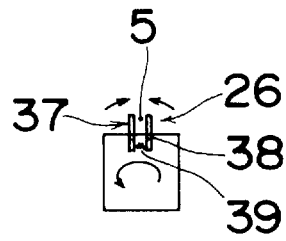
FIG. 5A is a schematic side view of a mechanism for holding a terminal end of a wire in the embodiment.
Figure 5B:
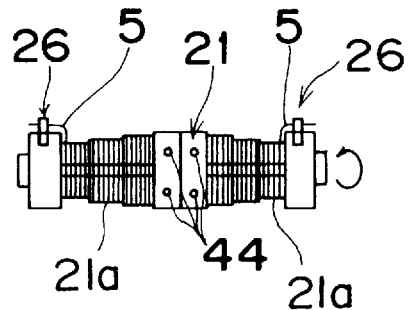
FIG. 5B is a schematic front view of the holding mechanism of FIG. 5A.
Figure 32:
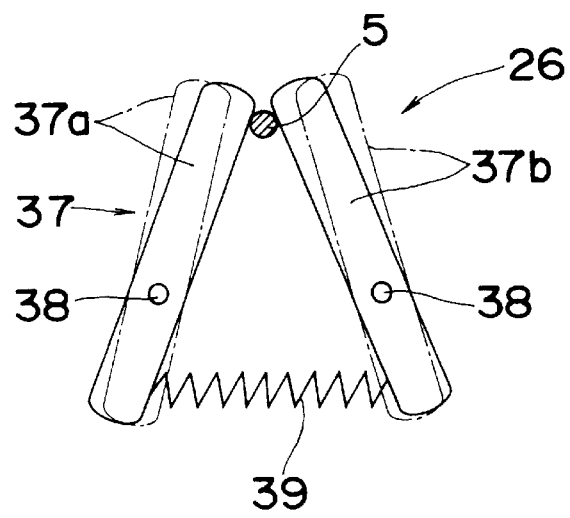
FIG. 32 is an enlarged plan view of a holding mechanism in the first embodiment.
Figure 33:
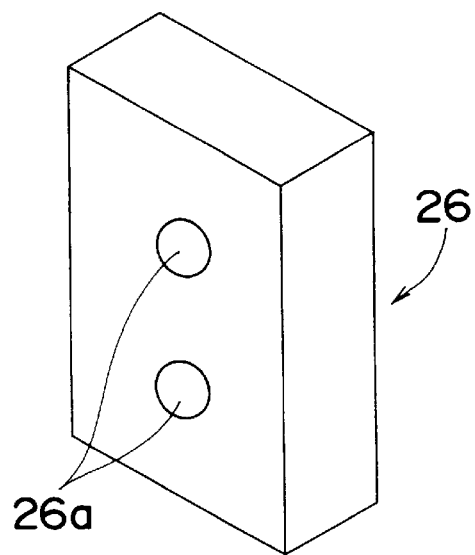
FIG. 33 is a perspective view of the holding mechanism.
Figure 34:
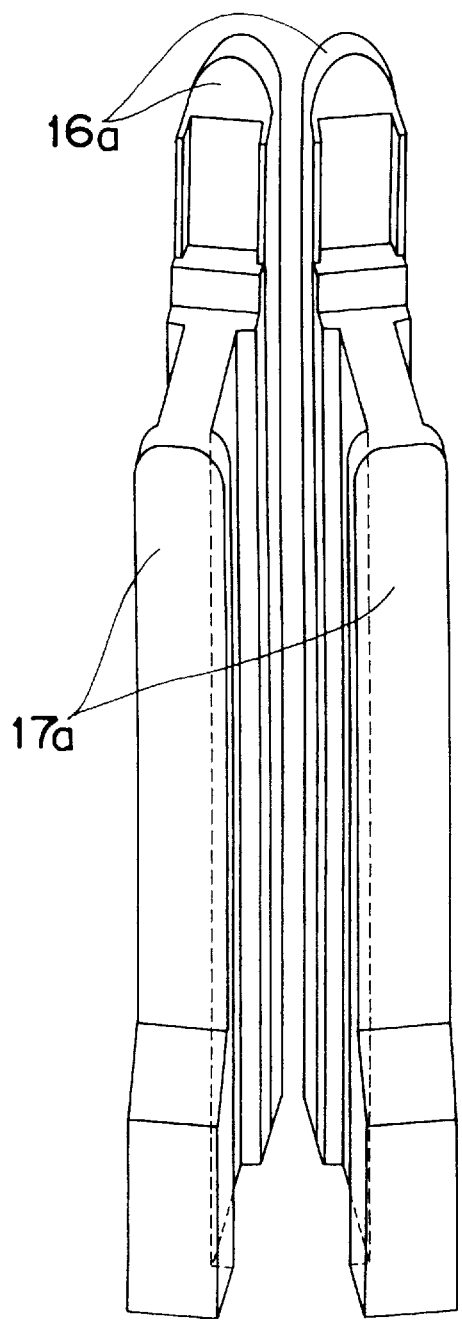
FIG. 34 is a perspective view of a part of a blade and a wedge guide.
Figure 35:
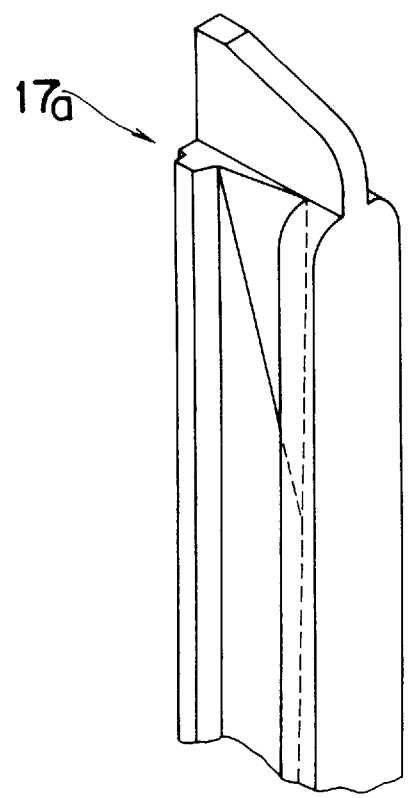
FIG. 35 is a perspective view of a part of a blade element of the blade of one conventional example.
Figure 36:
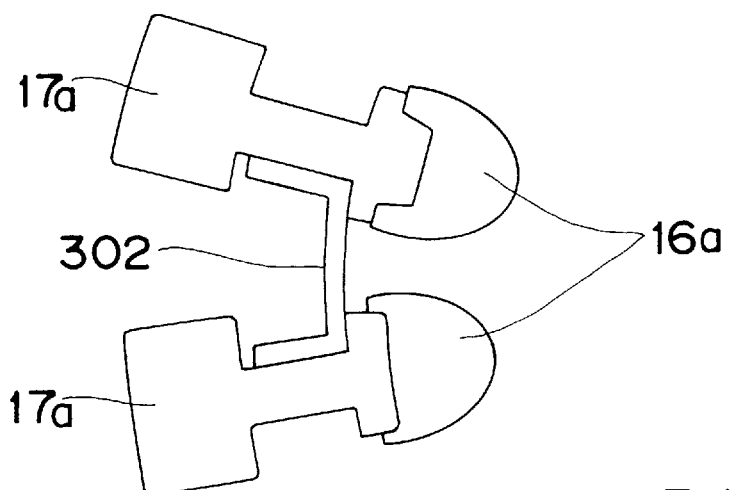
FIG. 36 is a plan view of a part of the blade, wedge guide, and a wedge.
Figure 37:
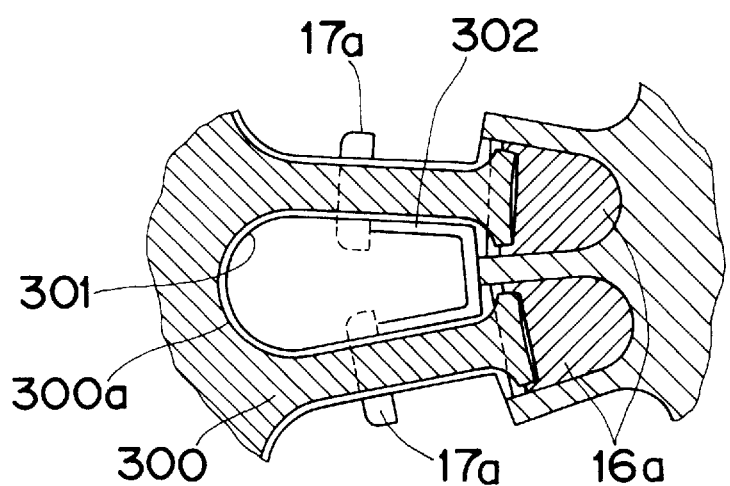
FIG. 37 is a partially plan view showing a state where a stator core is placed on the blade, wedge guide, and wedge.

FIGS. 5A, 5B, and 32 show each of the holding mechanisms 26 in detail. The holding mechanism 26 includes a chuck 37 having a pair of chuck claws 37a, 37b oscillatable around fulcrum pins 38 and a spring 39 for urging the ends of the claws 37a, 37b into contact with each other. Therefore, the wire 5 can be held between the ends of the chuck claws 37a, 37b by means of the spring 39 as indicated by solid lines in FIG. 32, while a member for separating the ends of the claws 37a, 37b from each other can be inserted between the ends of the claws 37a, 37b to remove the wire 5 from between them as indicated by dashed lines in FIG. 32. As shown in FIG. 33, the holding mechanism 26 also has two holes 26a into which two pins 21b of each end surface of the winding frame 21 are inserted so that the winding frame 21 is integrally and removably connected to the holding mechanism 26.

Figure 6A:
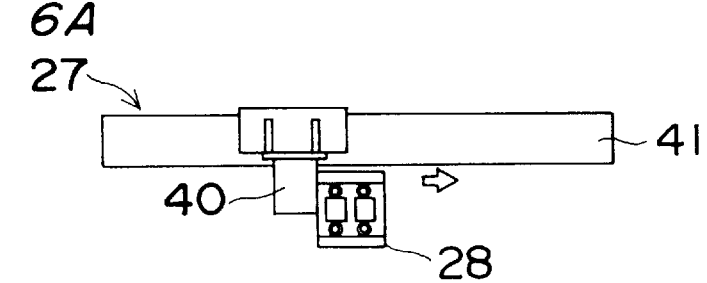
FIG. 6A is a plan view of a transferring device for a winding frame in the embodiment.
Figure 6B:
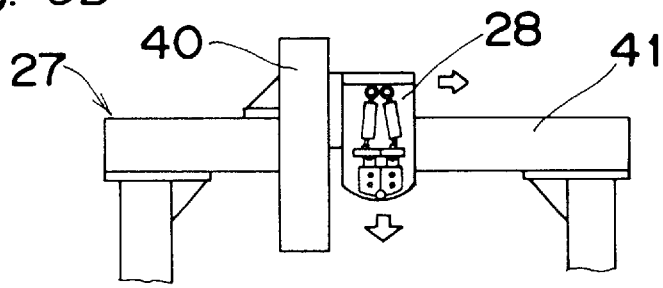
FIG. 6B is a front view of the transferring device of FIG. 6A.

FIGS. 6A and 6B show the transferring device 27, which has a lift device 40 for moving the handling mechanism 28 up and down and a moving device 41 for moving the handling mechanism 28 and lift device 40 in a horizontal direction. The lift device 40 and the moving device 41 each have the same construction as that of the nozzle-moving device 25. That is, the lift device 40 is set on the table of the moving device 41 which is moved in right and left directions in FIGS. 6A and 6B, and the handling mechanism 28 is set on the table of the lift device 40 which is moved in up and down directions in FIGS. 6A and 6B.

Figure 7:
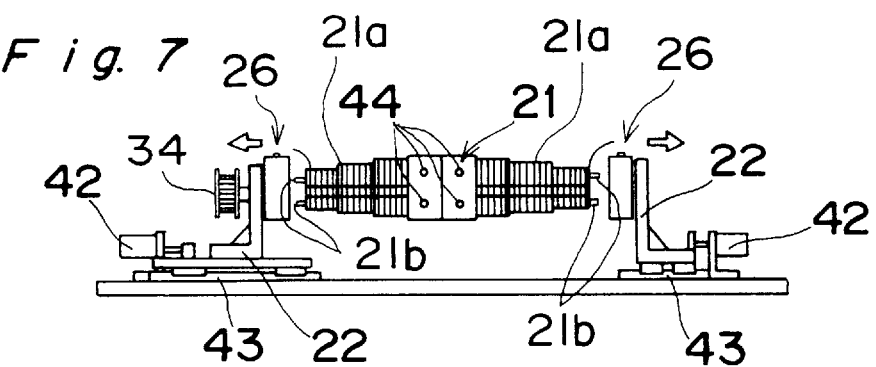
FIG. 7 is a schematic view of the holding mechanism of FIG. 5.
Figure 8:
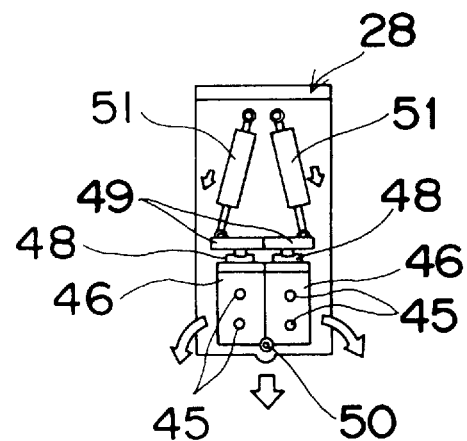
FIG. 8 is a schematic front view of a mechanism for handling the winding frame in the embodiment.
Figure 9:
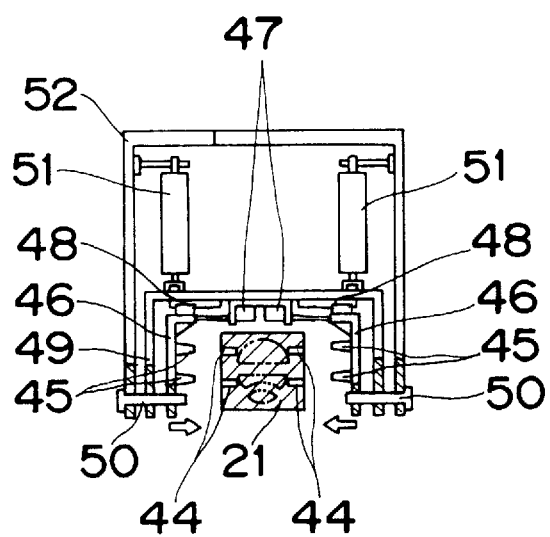
FIG. 9 is a schematic sectional side view of the handling mechanism of FIG. 8.

FIGS. 7 and, 8 and 9 indicate the supporting mechanism 22 and handling mechanism 28, respectively. In FIG. 7, a linear mechanism 42 moves the supporting mechanism 22 back and forth, a linear guide 43 guides the mechanism 22 when the mechanism 22 is moved back and forth, and eight engaging holes 44 are formed in the winding frame 21 for holding the winding frame 21. The handling mechanism 28 shown in FIGS. 8 and 9 is comprised of eight fitting pins 45 for being fitted into the eight engaging holes 44 to hold the winding frame 21, holding brackets 46 where the eight fitting pins 45 are formed, driving devices 47 such as pneumatic cylinders for moving the holding brackets 46 back and forth (in right and left directions of FIG. 9), linear guides 48 for guiding the back-and-forth movements of the holding brackets 46, opening/closing brackets 49 with the holding brackets 46, etc., fulcrum pins 50 for supporting the holding brackets 46 and the opening/closing brackets 49, driving devices 51 such as pneumatic cylinders for oscillating to open/close the opening/closing brackets 49 at the fulcrum pins 50, and a unit body 52 wherein the fulcrum pins 50 and the driving devices 51 are disposed. The handling mechanism 28 is mounted on the lift device 40.

Figure 42:
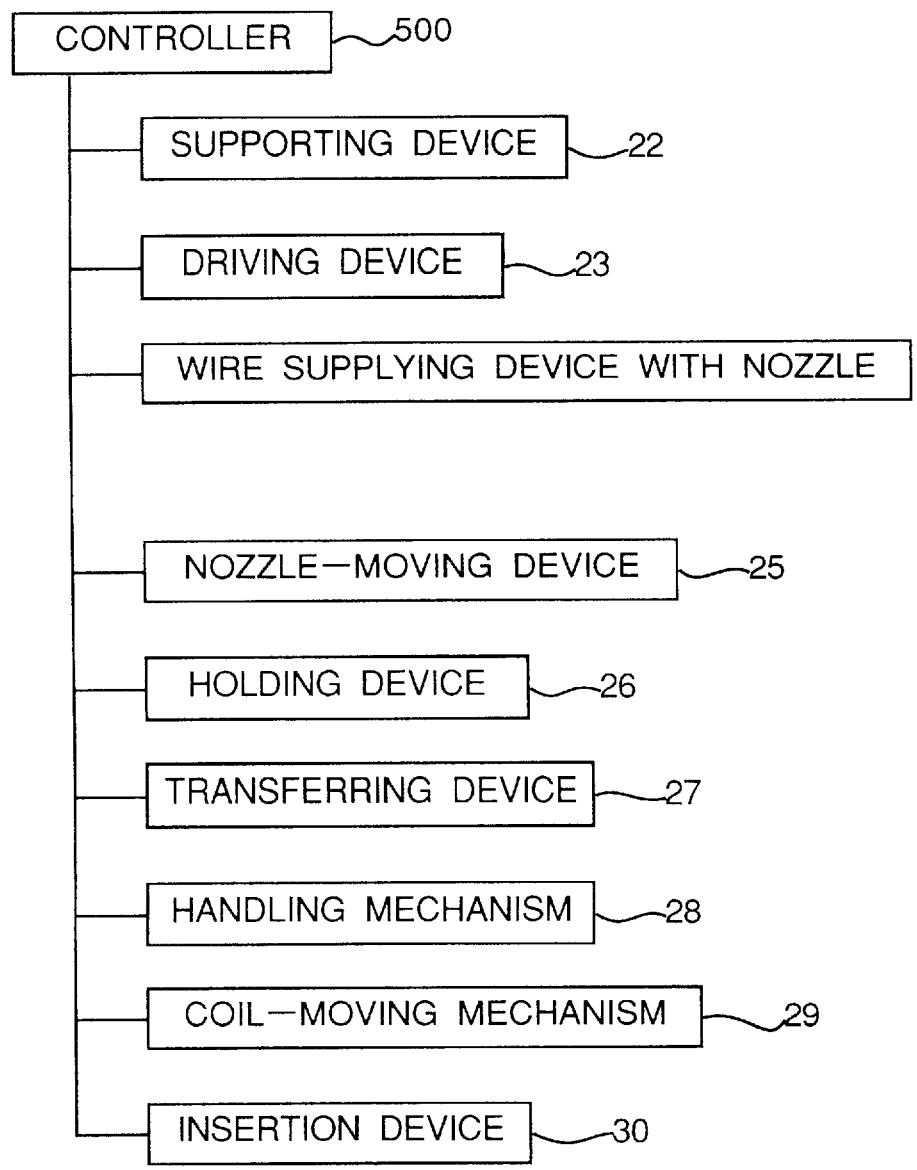
FIG. 42 is a block diagram of the control section of the apparatus.

As shown in FIG. 42, the supporting device 22, the driving device 23, a wire supplying device including the nozzle 24, the nozzle-moving device 25, the holding device 26, the transferring device 27, the handling mechanism 28, the coil-moving mechanism 29, and the insertion device 30 are connected to a controller 500. Thus, the controller 500 controls the following operations of the above devices and mechanisms to automatically carry out the specified operations described below.

Figure 10:
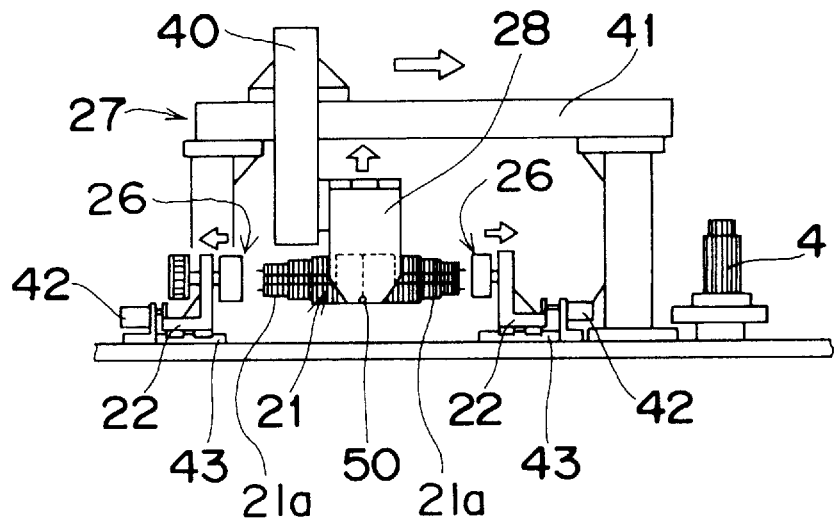
FIG. 10 is a diagram showing a state when the winding frame, after being completely wound is held by the handling mechanism.
Figure 11:
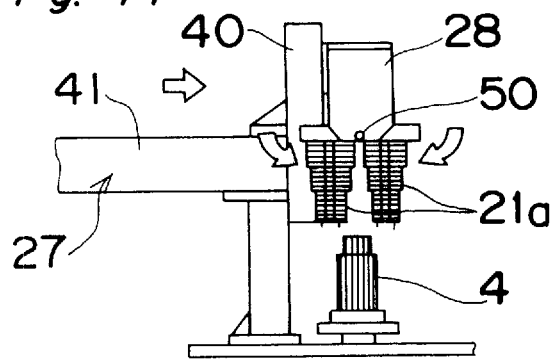
FIG. 11 is a diagram showing a state when the winding frame, after being completely wound, is held in a separated state by the handling mechanism.
Figure 12:
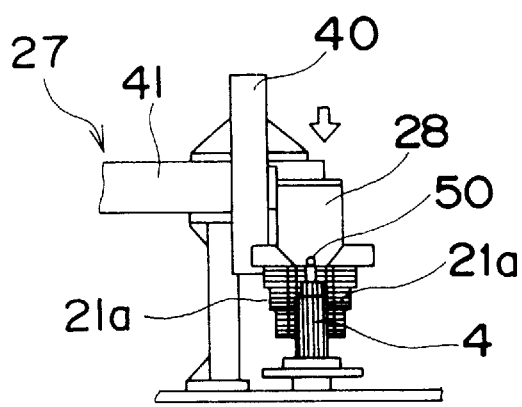
FIG. 12 is a diagram of a state when the winding frame projects into a coil insertion jig.
Figure 13:
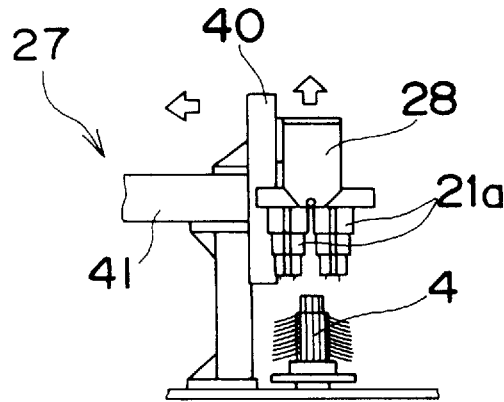
FIG. 13 is a diagram of a state when the coils wound around the winding frame elements are transferred to the coil insertion jig.

A sequence of operations by the transferring device 27 is indicated in FIG. 10. When the handling mechanism 28 is lowered by the lift device 40, the fitting pins 45 are fitted into the engaging holes 44 and then the completely-wound winding frame 21 is held by the holding brackets 46, driving devices 47, and linear guides 48. Then, the supporting mechanisms 22 are retracted by the linear mechanisms 42 and linear guides 43 to release the winding frame 21. The handling mechanism 28 holding the wound winding frame is raised and moved horizontally by the lift device 40 and the moving device 41 to the coil insertion jig 4. At the same time, as shown in FIG. 11, the winding frame 21 is oscillated at the fulcrum pins 50 by the opening/closing brackets 49 and the driving devices 51, whereby the winding frame 21 is separated into the elements 21a. In FIG. 12, the winding frame 21 is inserted into the coil insertion jig 4 by the lift device 40. Subsequently, in FIGS. 13 and 14, the coil wound around the winding frame 21 is moved to the coil insertion jig 4 by the coil-moving mechanism 29. The winding frame 21 is then moved up by the lift device 40. In a flow of operations in opposite order to the above, the winding frame 21 is transferred to the supporting mechanisms 22. The handling mechanism 28 releases the winding frame 21 held by the supporting mechanisms 22 before the handling mechanism 28 moves upward, whereby the sequence of transferring operations of the winding frame 21 is completed.

Figure 14A:
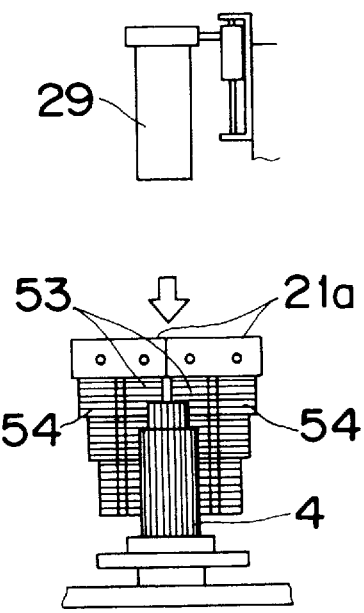
FIG. 14A is a diagram of a state when the winding frame projects into the coil insertion jig.
Figure 14B:
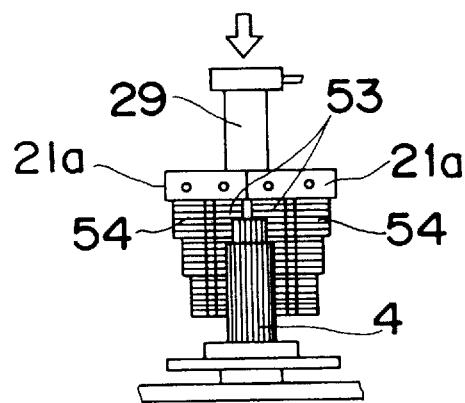
FIG. 14B is a diagram of a state when a coilmoving mechanism projects into a fixed winding frame.
Figure 14C:
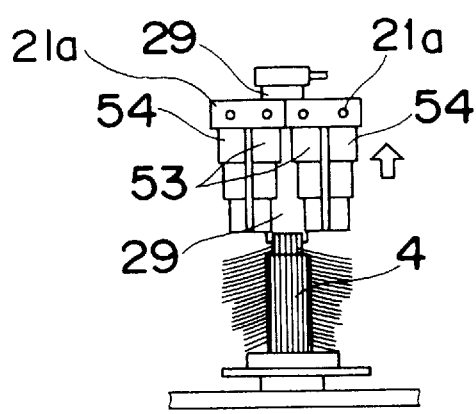
FIG. 14C is a diagram of a state when the coils are transferred to the coil insertion jig.
Figure 14D:
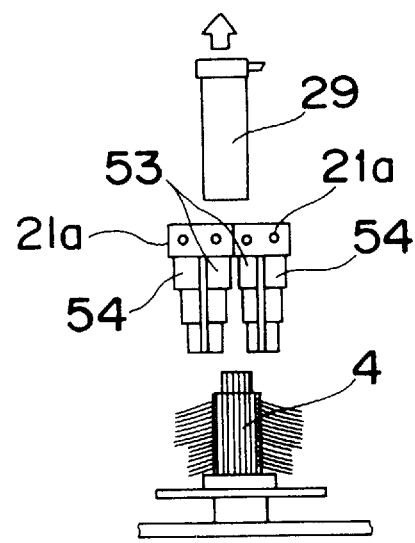
FIG. 14D is a diagram of a state when the winding frame elements come out of the coil-moving mechanism.

An operation to move the coil will be described with reference to FIGS. 14A–14D. In FIG. 14A, the winding frame 21 enters the coil insertion jig 4. A fixed winding frame 53, as a part of the winding frame 21, is projectable into the coil insertion jig 4 via a slight gap, and moreover allows the coil-moving mechanism 29 to project thereinto in the vicinity of an outer periphery of the coil insertion jig 4 via a small distance. The movable winding frame 54 pairs with the fixed winding frame 53. The coil-moving mechanism 29 projects into the fixed winding frame 53 in FIG. 14B. At this time, the lowest end of the coil-moving mechanism 29 descends to the vicinity of an uppermost end of the coil insertion jig 4. In FIG. 14C, the winding frame 21 moves up to a position where it slips out from the coil insertion jig 4. In consequence, the coils wound around the winding frame elements 21a are depressed by the coil-moving mechanism 29, and eventually moved to the coil insertion jig 4. In FIG. 14D, the coil-moving mechanism 29 moves up to be separate from the winding frame elements 21a. The sequence of moving operations for the coils is thus finished.

Figure 16:
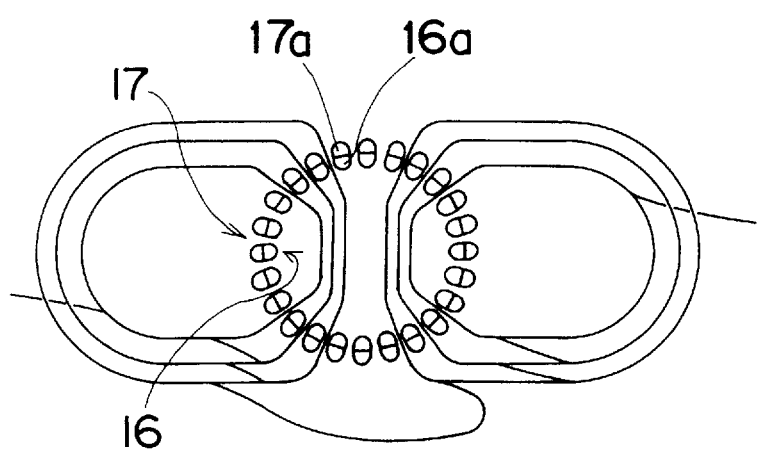
FIG. 16 is a diagram partly in detail of a state when the coils are moved to the insertion jig.
Figure 17:
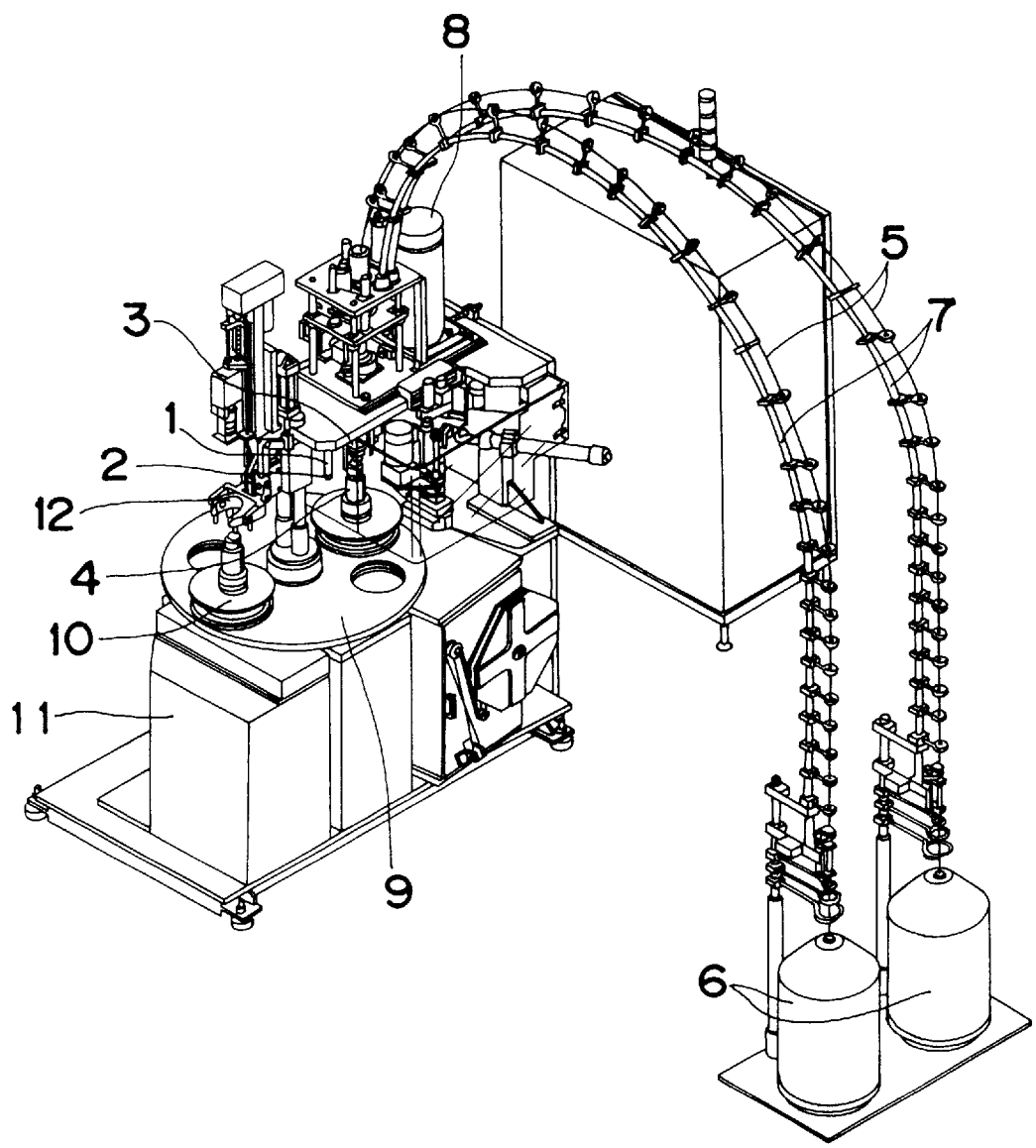
FIG. 17 shows an appearance of a conventional stator coil winding machine of a flyer type.
Figure 18:
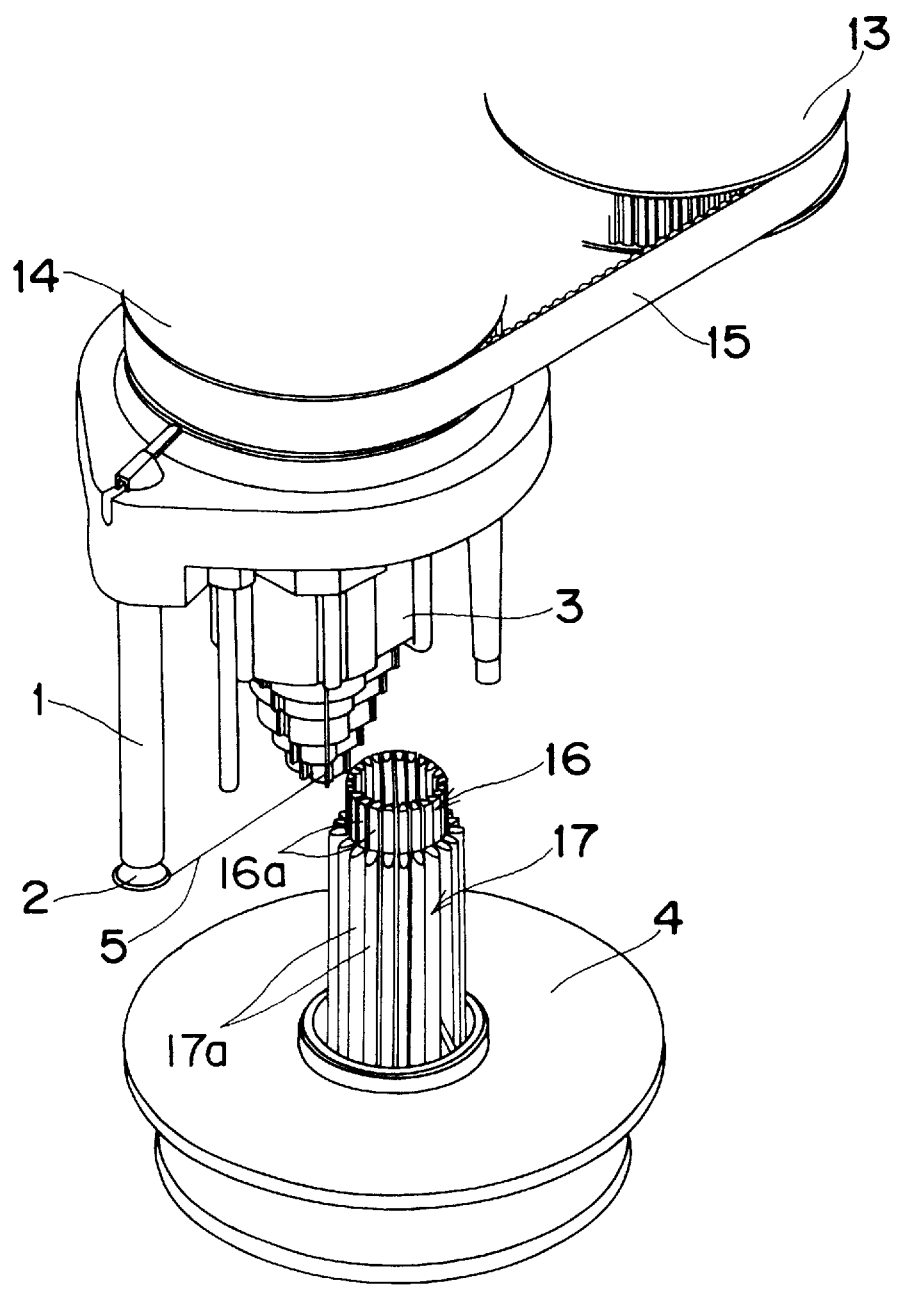
FIG. 18 is an enlarged view of a winding frame and a coil insertion jig of the conventional stator coil winding machine.
Figure 19:
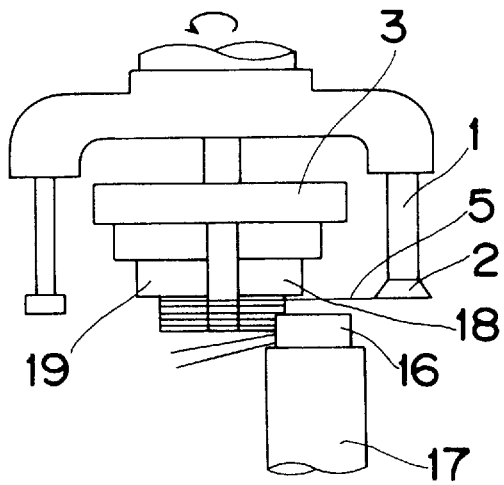
FIG. 19 is a diagram of a coil winding at a first stage wound by a flyer of the conventional stator coil winding machine with respective blade elements and wedge guide elements omitted.
Figure 20:
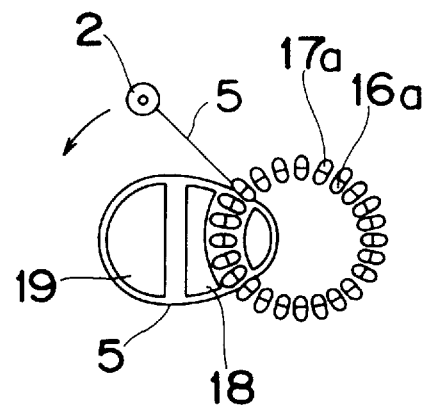
FIG. 20 is a diagram showing the relationship of a blade, a wedge guide, and the winding frame in FIG. 19.
Figure 21:
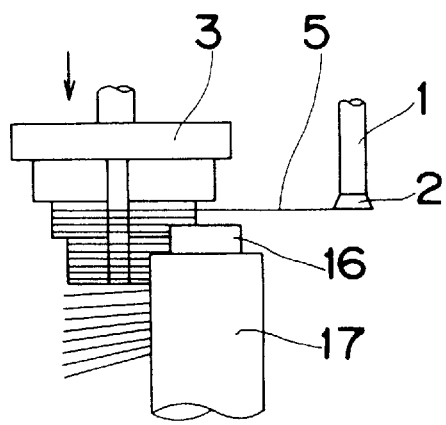
FIG. 21 is a diagram of a coil winding at a second stage wound by the flyer in the conventional stator coil winding machine with respective blade elements and wedge guide elements omitted.
Figure 22:
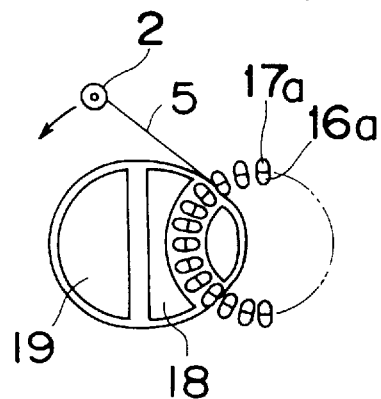
FIG. 22 is a diagram showing the relationship of the blade, wedge guide, and winding frame of FIG. 21.
Figure 23:
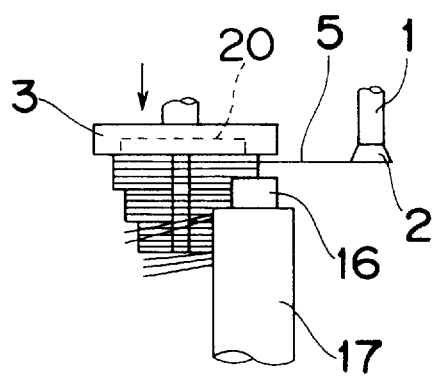
FIG. 23 is a diagram of a coil winding of a third stage wound by the flyer in the conventional stator coil winding machine with respective blade elements and wedge guide elements omitted.
Figure 24:
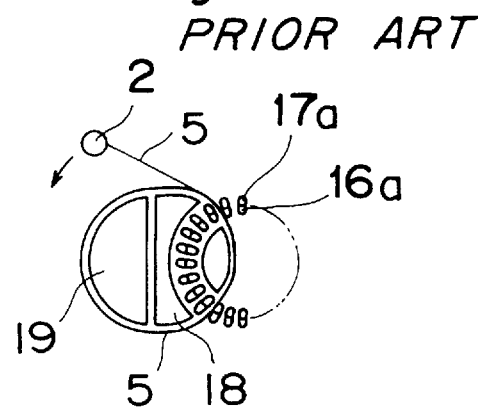
FIG. 24 is a diagram of the relationship of the blade, wedge guide, and winding frame in FIG. 23.
Figure 25:
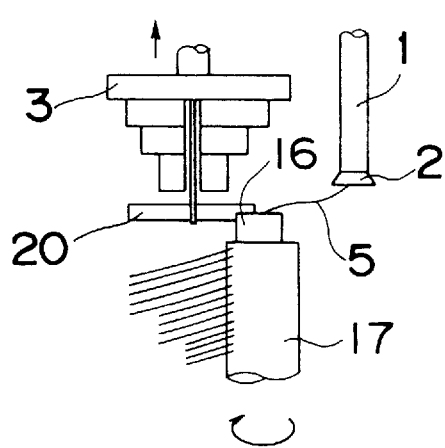
FIG. 25 is a diagram showing a state when a coil is moved to the coil insertion jig of the conventional stator coil winding machine with respective blade elements and wedge guide elements omitted.
Figure 26:
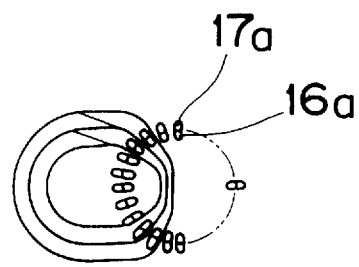
FIG. 26 is a diagram schematically showing the coil moved to the coil insertion jig of the conventional stator coil winding machine.
Figure 27:
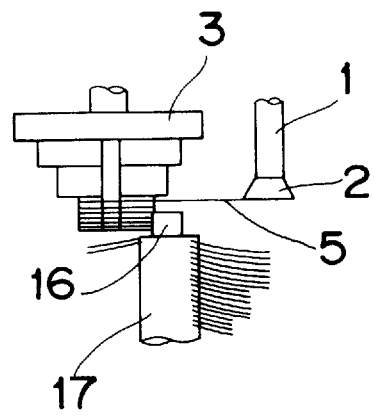
FIG. 27 is a diagram of a state of a winding of a second pole in the conventional stator coil winding machine with respective blade elements and wedge guide elements omitted.
Figure 28:
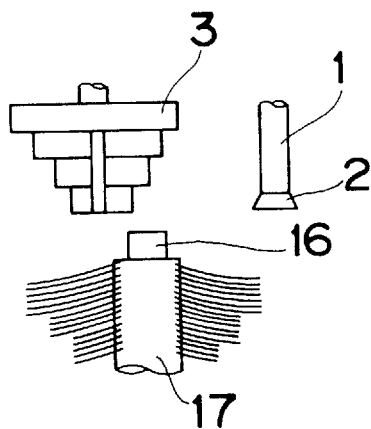
FIG. 28 is a diagram of a state when windings of a plurality of poles are completed in the conventional stator coil winding machine with respective blade elements and wedge guide elements omitted.
Figure 29:
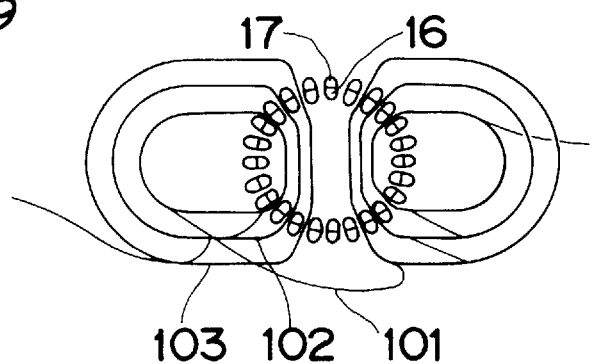
FIG. 29 is a diagram of a state when windings of a plurality of poles are moved to the coil insertion jig in the conventional stator coil winding machine.
Figure 30:
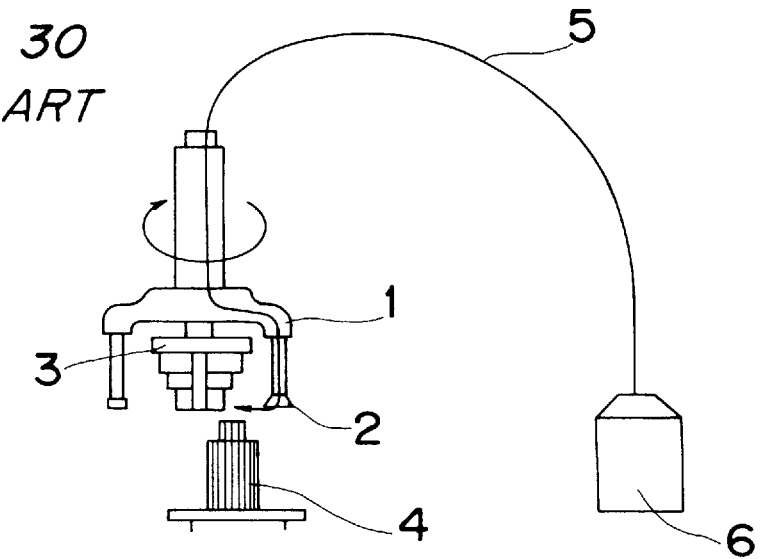
FIG. 30 is a diagram showing the relationship of a fed wire and flyer in the conventional stator coil winding machine.
Figure 38:
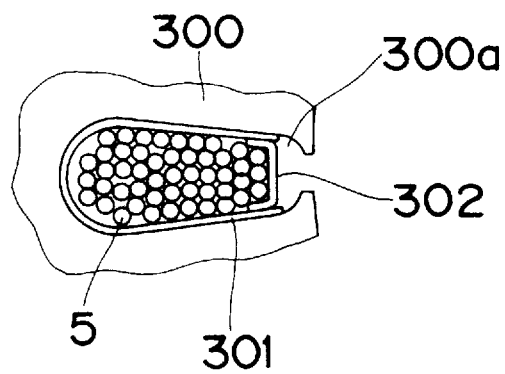
FIG. 38 is a sectional plan view of a part of a stator coil with a coil set in the stator core.
Figure 39:
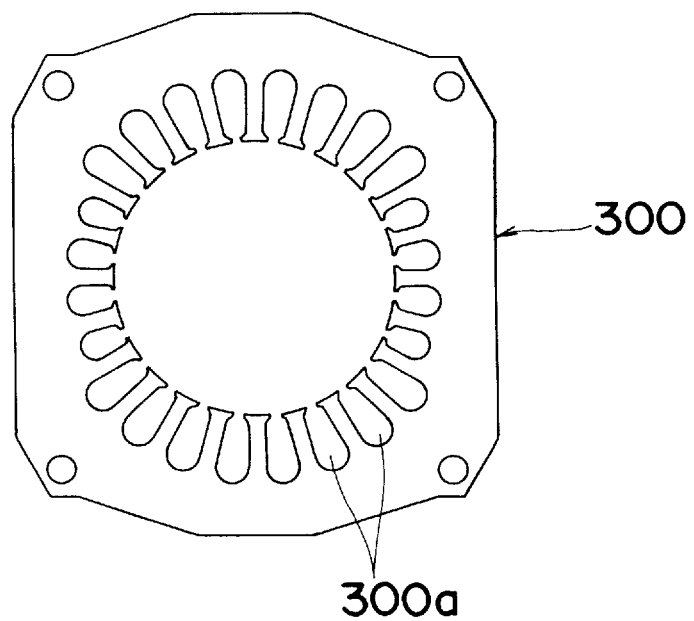
FIG. 39 is a plan view of the stator core before the coil is set.
Figure 40:
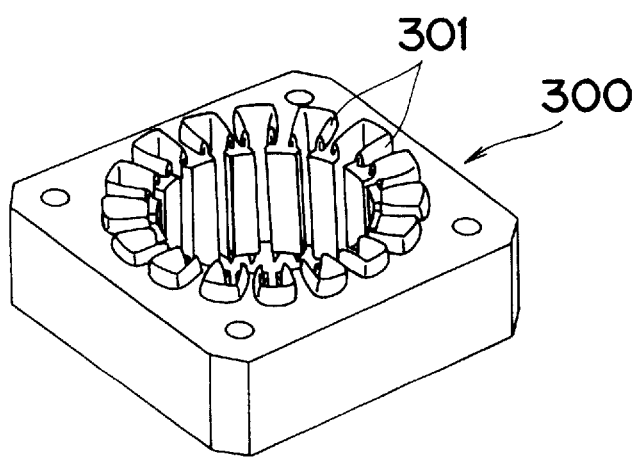
FIG. 40 is a perspective view of the stator core of FIG. 39.
Figure 41:
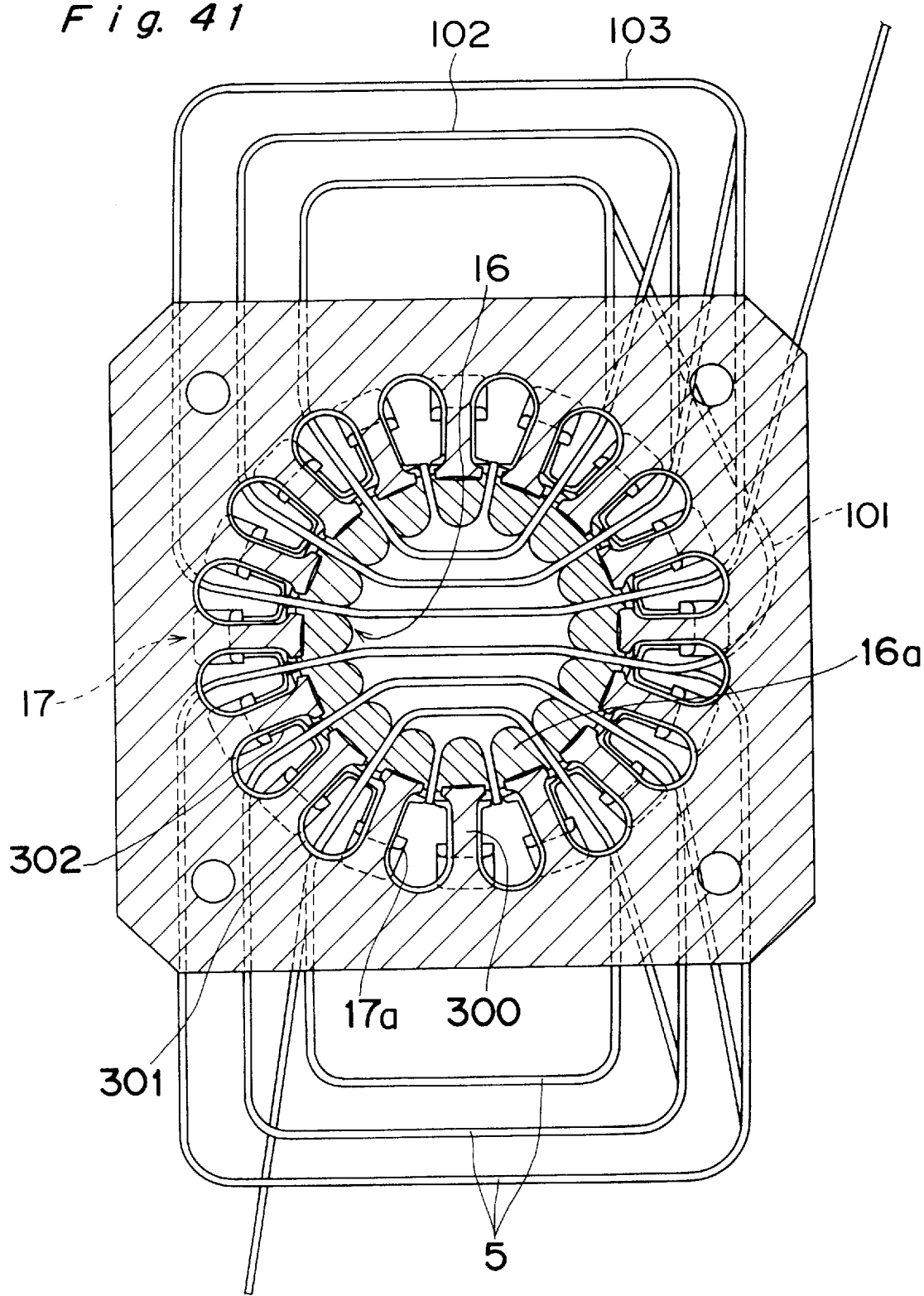
FIG. 41 is a plan view of the stator coil.

Then, the windings of the coil insertion jig 4 are set in the stator core 300 as shown in FIG. 38 to form a stator coil having the coils of two poles of FIG. 16 in a similar manner to the conventional one.

Figure 15:
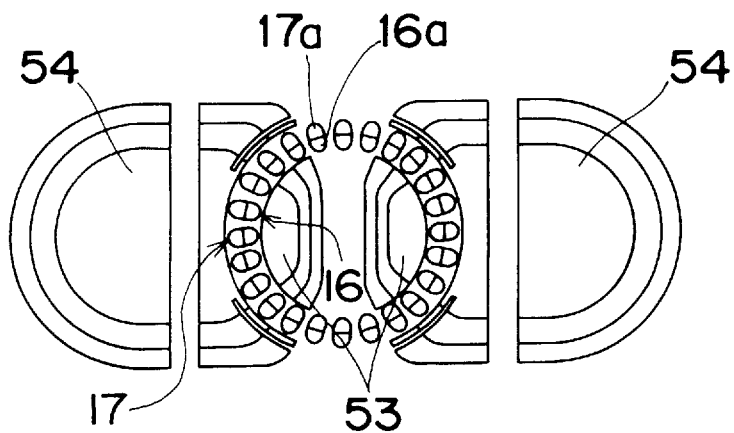
FIG. 15 is a partially detailed diagram of a state when the winding frame projects into the coil insertion jig.

In the above-described arrangement of the present embodiment, as is clear from FIGS. 15 and 16, the wire is prevented from crossing the coil wound subsequent to that of the first pole.

According to the present invention, there are provided the winding frame separable at the vertical face, a supporting device including the supporting mechanisms capable of rotating/detaching the winding frame, the driving device for rotating the winding is separated, the nozzle for supplying and winding the wire to the winding frame, the transferring device for moving the nozzle in parallel to the rotary shaft of the winding frame, a holding device including the holding mechanism for holding the terminal end of the wire when the wire is wound, the transferring device for transferring the wound winding frame to the separately-set insertion jig, the handling mechanism for oscillating the winding frame at the vertical face to the rotary shaft about the fulcrums in the vicinity of the rotary shaft, thereby separating and holding the winding frame so that the rotary shafts of the separated winding frame elements are parallel to each other, the coil-moving mechanism for moving the coils wound around the separated winding frame elements to the insertion jig, and the insertion device for inserting the moved coils to the stator core with the insertion jig. In this constitution of the invention, the method and apparatus achieve superior stator coil windings, realizing high efficiency and high quality of motors.

That is, in the constitution as above, the winding frame of the invention, which is constituted of a plurality of winding frames of generally the same constitution as a conventional winding frame is rotated to wind the wire fed from the nozzle a predetermined number of times. The winding frame after the wire is wound is separated into winding frame elements, and the elements are inserted into the insertion jig. Accordingly, coils of the first pole and thereafter are moved to the insertion jig altogether from the separated winding frame elements, whereby the coils of the first pole and thereafter are prevented from intersecting. Moreover, since the wire fed from the nozzle is wound around the winding frame while the winding frame rotates, the wire is prevented from twisting.

Although the present invention has been fully described in connection with the preferred embodiments thereof and with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method for producing a stator coil winding, comprising:
   winding a wire fed from a nozzle around a separable winding frame while the separable winding frame is rotated, the separable winding frame comprising two separable winding frame elements and a connection part therebetween, and said winding comprising sequentially winding the wire around the two winding frame elements including passing the wire through the connection part so as to form a coil around each of the separable winding frame elements;
   using a handling mechanism to separate the separable winding frame into the two winding frame elements at a face orthogonal to a rotary shaft of the winding frame, rotate the winding frame elements about a fulcrum in the vicinity of the face, and hold the separated winding frame elements so that the rotary shafts of the separated winding frame elements are parallel to each other;
   inserting a coil formed by the wire around each separated winding frame element of the winding frame into a coil insertion jig to thereby form coils of a plurality of poles; and
   inserting the coils of a plurality of poles into a stator core to form a stator coil.

2. A method of producing a stator coil winding comprising:
   supplying a wire from a nozzle to a winding frame that is capable of being separated into two winding frame elements;
   holding one terminal end of the wire with a holding device;
   rotating the winding frame with a driving device so as to wind the wire around the winding frame while the nozzle is moved by a nozzle moving device in a direction parallel to a rotary shaft of the winding frame;

holding the other terminal end of the wire wound around the winding frame with the holding device after the wire is completely wound around the winding frame;

carrying the winding frame having the wire completely wound there around to a coil insertion jig with a transferring device;

separating the winding frame into the two winding frame elements at a face orthogonal to the rotary shaft of the winding frame and rotating the winding frame elements about a fulcrum in the vicinity of the face to hold the separated winding frame elements so that the rotary shafts of the separated winding frame elements are parallel to each other with a handling mechanism;

moving a coil formed by the wire wound around each separated winding frame element to the insertion jig with a coil moving mechanism; and inserting the coils transferred to the insertion jig into a stator core to form a stator coil.

3. The method of claim 2, wherein each of said supplying a wire, holding one terminal, rotating the winding frame, holding the other terminal, carrying the winding frame, separating and rotating the winding frame, moving the coil and inserting the coils is carried out automatically under the control of a controller.

4. A method for producing a stator coil winding, comprising:

rotating a winding frame about an axis thereof, the winding frame comprising two adjoining separable winding frame elements disposed linearly along the axis;

winding a wire fed from a nozzle around the winding frame while the winding frame rotates, said winding comprising sequentially winding the wire around the two winding frame elements so as to form a coil around each of the winding frame elements;

using a handling mechanism to separate the winding frame into the two winding frame elements at a face orthogonal to the axis of the winding frame, rotate the winding frame elements, and hold the separated winding frame elements so that axes of the separated winding frame elements are parallel to each other;

inserting a coil formed by the wire around each separated winding frame element of the winding frame into a coil insertion jig to thereby form coils of a plurality of poles; and inserting the coils of a plurality of poles into a stator core to form a stator coil.

5. The method of claim 4, wherein said winding comprises moving the nozzle in a direction parallel the axis of the winding frame while wire is fed from the nozzle and the winding frame is rotated, continuously and sequentially from one of the winding frame elements to the other of the winding frame elements.

6. The method of claim 5, and further comprising holding one terminal end of the wire at one end of the winding frame at one the two winding frame elements, during said winding, and holding the other terminal end of the wire at the other end of the winding frame at the other of the two winding frame elements after said winding.

* * * * *